United States Patent [19]

Buschbom

[11] 4,361,203
[45] Nov. 30, 1982

[54] POWER STEERING SYSTEM FOR MOTOR VEHICLE

[75] Inventor: Floyd E. Buschbom, Long Lake, Minn.

[73] Assignee: Veda, Inc., Long Lake, Minn.

[21] Appl. No.: 165,745

[22] Filed: Jul. 3, 1980

[51] Int. Cl.³ .............................................. B62D 5/06
[52] U.S. Cl. ...................................... 180/213; 92/137
[58] Field of Search ........................... 74/89.2, 89.21; 92/117 R, 117 A, 137; 180/210, 211, 212, 213, 214, 215, 216, 217, 160, 161, 162, 150, 145, 137, 140

[56] References Cited

U.S. PATENT DOCUMENTS

| | | | |
|---|---|---|---|
| 2,317,412 | 4/1943 | Shaffer | 89/40 |
| 2,404,639 | 7/1946 | Lane | 92/117 A |
| 2,742,100 | 4/1956 | Rockwell | 180/137 |
| 2,827,975 | 3/1958 | Brand | 180/162 |
| 2,874,793 | 2/1959 | Wagner | 180/161 |
| 3,403,745 | 10/1968 | Commons | 180/26 |
| 3,519,097 | 7/1970 | Commons | 180/26 |
| 3,695,374 | 10/1972 | Commons | 180/27 |
| 4,182,426 | 1/1980 | Balzer | 180/12 |
| 4,222,452 | 9/1980 | Fachini | 180/162 |
| 4,225,110 | 9/1980 | Akkerman | 92/137 |

Primary Examiner—Joseph F. Peters, Jr.
Assistant Examiner—Ross Weaver
Attorney, Agent, or Firm—Burd, Bartz & Gutenkauf

[57] ABSTRACT

A motor vehicle having a plurality of drive wheels and a steerable wheel. The steerable wheel is rotatably mounted on the frame with an upright steering post. A hydraulic powered transversely movable cylinder is connected to a sprocket mounted on the steering post with a pair of chains. The cylinder is linearly movable relative to a piston and a transverse rod. Adjustable members connect opposite ends of the rod to the frame and hold the rod in linear tension. The cylinder is supplied with hydraulic fluid under pressure from a pump driven by an internal combustion engine. A control valve having a spool connected to the vehicle steering wheel controls the flow of hydraulic fluid under pressure from the pump to the cylinder thereby steering the vehicle.

31 Claims, 7 Drawing Figures

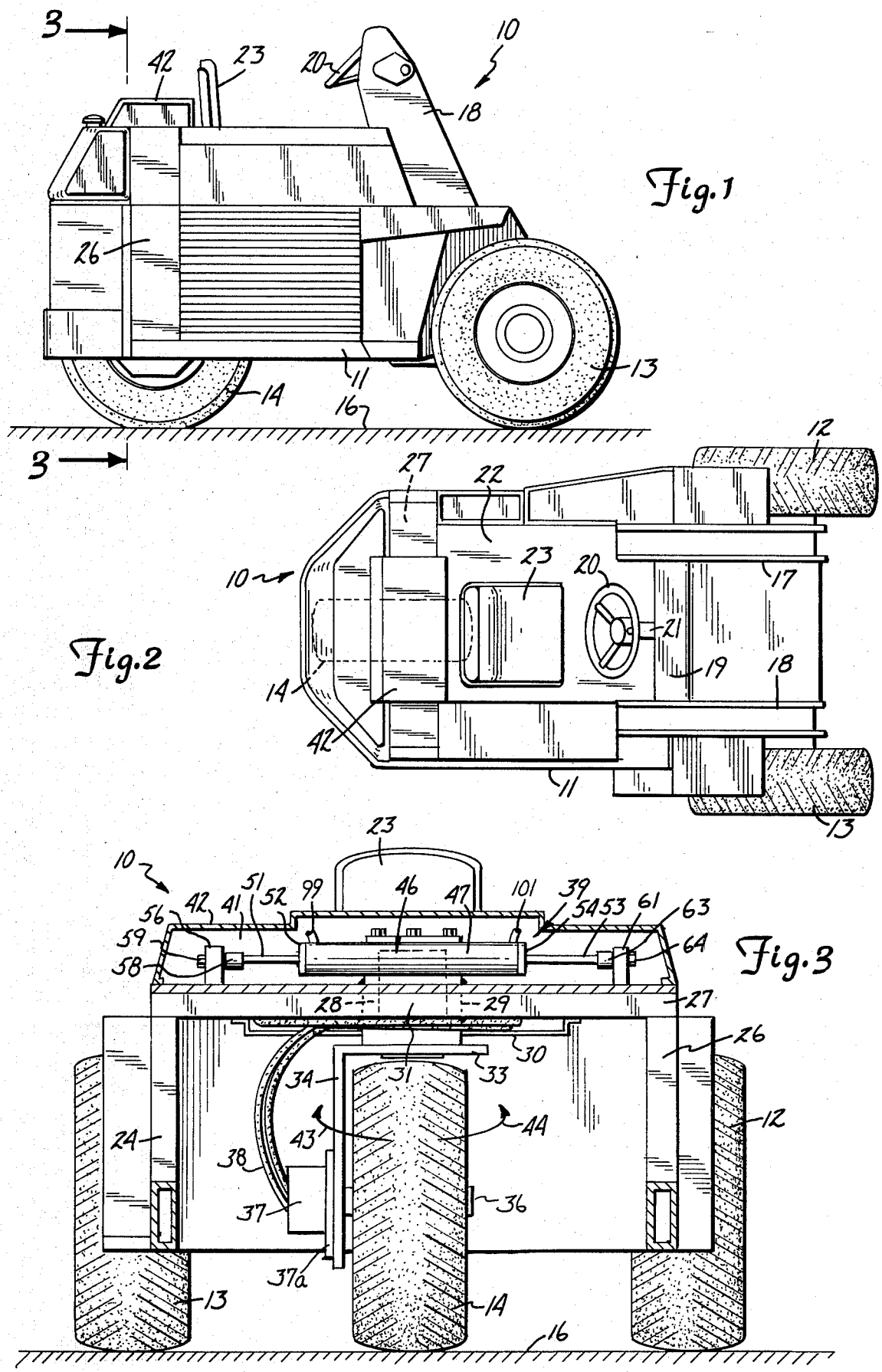

U.S. Patent    Nov. 30, 1982    Sheet 2 of 2    4,361,203
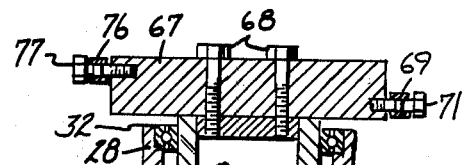
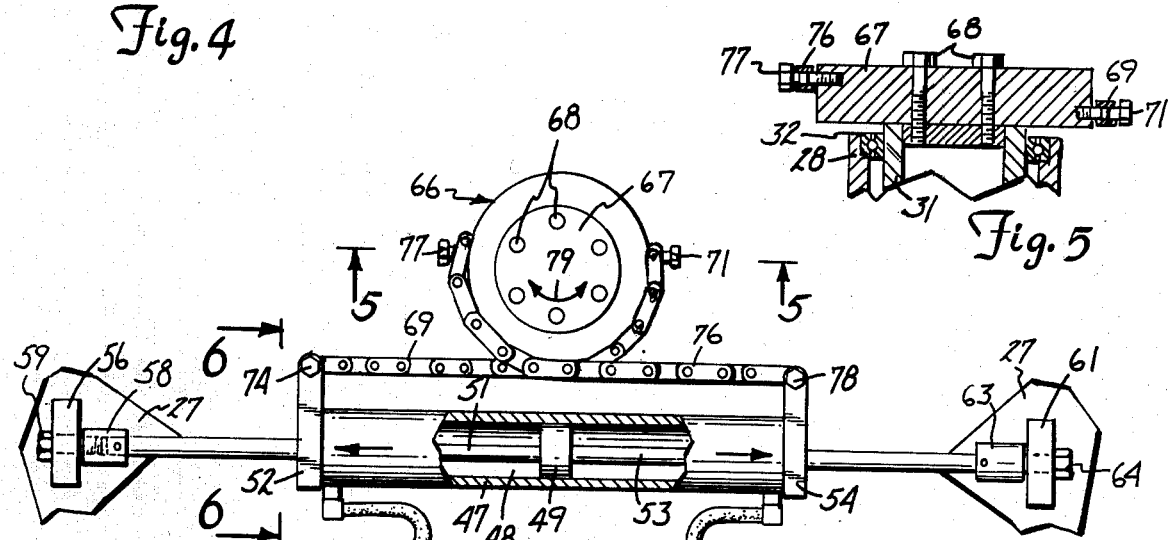
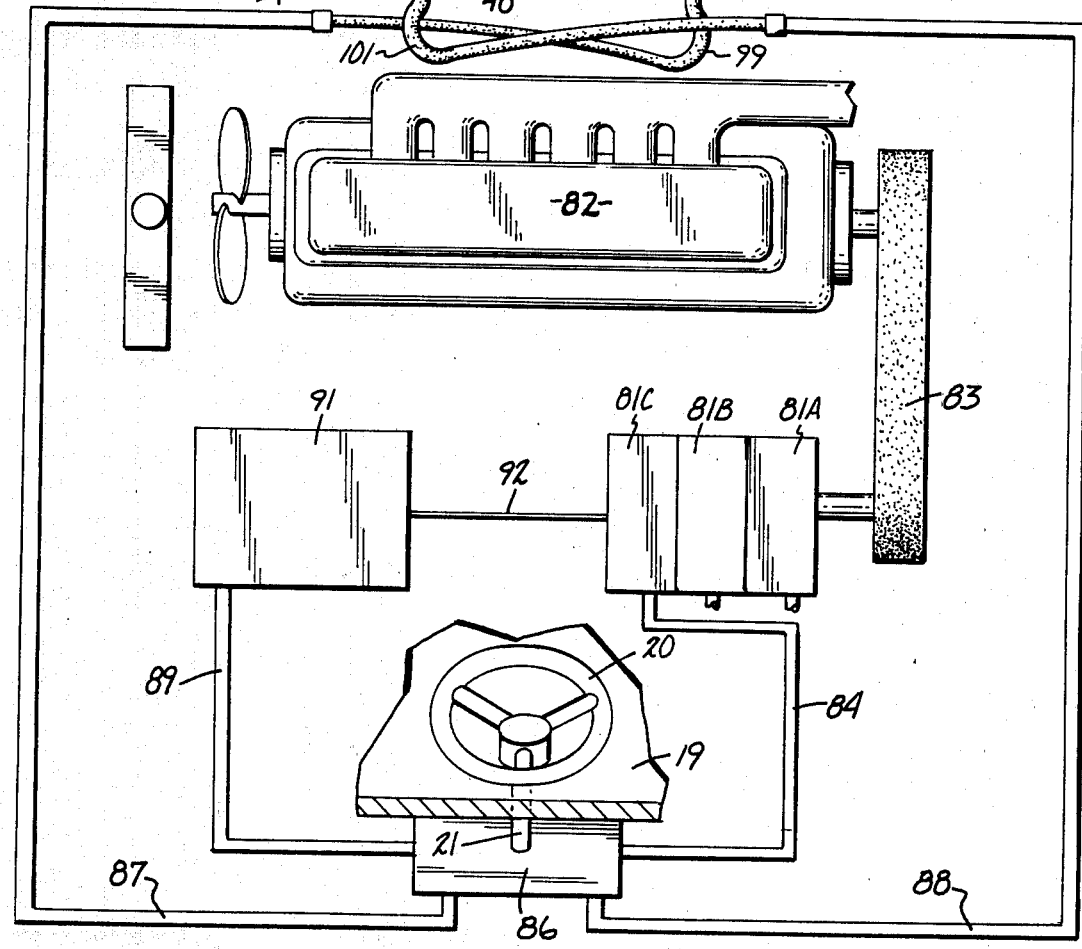
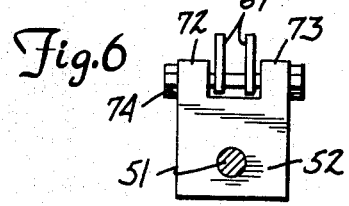
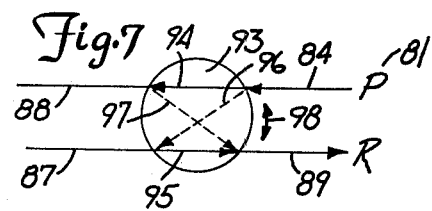

POWER STEERING SYSTEM FOR MOTOR VEHICLE

SUMMARY OF INVENTION

The invention is directed to a powered control for moving a member to a selected position. The control includes a linear to rotary motion transmission means that is operable in response to a manually movable control. More particularly, the invention is directed to a vehicle having wheel means engageable with the ground. One of the wheel means is a steerable wheel means that is rotatable about a generally upright axis to steer the vehicle. A first means rotatably mounts the steerable wheel means on a vehicle frame for movement about a generally upright axis. A second means is connected to the first means for rotating the first means to a selected position and thereby turning the steerable wheel to steer the vehicle. The second means includes cylinder means having a chamber accommodating piston means. Transverse rod means mounted on the vehicle frame are connected to the piston means. Opposite ends of the rod means are connected with adjustable means to mounts fixed to the frame. The adjustable means operate to hold the rod means in linear tension to minimize lateral deflection or bending of the rod means. The cylinder means is selectively movable in opposite directions relative to the rod means and piston means in response to fluid pressure supplied to the opposite ends of the chamber.

A power transmitting means is connected to the cylinder means and the first means so that on movement of the cylinder means the first means is rotated about the generally upright axis to turn the steerable wheel means. Fluid under pressure from a pump means is supplied to opposite ends of the chamber of the cylinder means. A control valve means operatively connected with the steerable wheel of the vehicle selectively directs fluid to opposite ends of the chamber of the cylinder means. The valve means has a movable member that selectively controls they hydraulic fluid under pressure from the pump to opposite ends of the chamber of the cylinder means to thereby selectively move the cylinder means in opposite directions to rotate the first means and thereby steer the vehicle.

IN THE DRAWINGS

FIG. 1 is a side elevational view of a motor vehicle equipped with the steering apparatus of the invention;

FIG. 2 is a top plan view of FIG. 1;

FIG. 3 is an enlarged sectional view taken along the line 3—3 of FIG. 1;

FIG. 4 is a diagrammatic view of the fluid control system of the steering apparatus of FIG. 1;

FIG. 5 is an enlarged sectional view taken along the line 5—5 of FIG. 4;

FIG. 6 is a sectional view taken along the line 6—6 of FIG. 4; and

FIG. 7 is a diagrammatic view of the hydraulic control valve operated by the steering wheel of the vehicle of FIG. 1.

DESCRIPTION OF PREFERRED EMBODIMENT:

Referring to FIGS. 1 and 2, there is shown a motor vehicle indicated generally at 10 shown as a material handling lift truck. Vehicle 10 has a main frame 11 supporting a pair of front drive wheels 12 and 13 and a rear steerable wheel 14. Wheels 12, 13, and 14 engage the ground or similar supporting surface 16 and operate to move the vehicle. Vehicle 10 is a material handling vehicle. The vehicle can be a four-wheel vehicle or a track vehicle. The vehicle can be a truck structure or a self-unloading material mixing box. The following description is directed to a three-wheel drive material handling vehicle. It is understood that the invention disclosed herein can be employed with other types of vehicles and equipment.

A pair of upwardly and rearwardly directed posts 17 and 18 are attached to the front of frame 11 adjacent the insides of wheels 12 and 13. Posts 17 and 18 are channel members adapted to accommodate frame and object lifting structures (not shown), such as material handling buckets, blades, and forks. A transverse panel 19 is secured to and located between the upper ends of posts 17 and 18. A steering wheel 20 has a shaft 21 rotatably mounted on the center portion of panel 19. Steering wheel 20 is located above a generally horizontal platform 22 containing a seat 23. Seat 23 is located in the center portion of platform 22 behind steering wheel 20 so that the operator of the vehicle can conveniently turn steering wheel 20 when seated on seat 23.

Referring to FIG. 3, main frame 11 has a pair of upright side members 24 and 26 secured at their upper ends to a top transverse member 27 to form a generally inverted U-shaped frame structure. A plurality of transverse members can be secured to the top portions of side members 24 and 26. An upright cylindrical member or sleeve 28 is secured to the center of cross member 27. Cross member 27 has a center hole 29 accommodating sleeve 28. Upper and lower portions of sleeve 28 are secured to transverse member 27 with welds or the like. An upright steering post or spindle 31 is concentrically located in sleeve 28 and rotatably mounted thereon with bearings 32, as shown in FIG. 5. The lower end of spindle 31 is secured by welds or the like to a generally horizontal plate 33. The left end of plate 33 is attached to a downwardly directed leg 34. A second leg can be attached to the right end of plate 33. A horizontal axle 36 is secured to the lower ends of legs 34. Rear drive wheel 14 is rotatably mounted on axle 36 in general vertical alignment with spindle 31. Wheel 14 is driven with a motor 37, such as a hydraulic positive displacement piston motor, mounted on axle 36 and drivably connected with a power transmission or gear box 37a to wheel 14. Hydraulic lines or flexible hoses 38 connect motor 37 to a source of hydraulic fluid under pressure, such as a pump 81B and controls for regulating the flow of hydraulic fluid to the motor. Hoses 38 extend upwardly from motor 37 and wrap or coil around the lower part of spindle 31. A plurality of hose carrier straps 30 secured to member 27 support hose 38 below member 27. Hoses 38 can be coiled two or three times around spindle 31 to minimize sharp turns or bends of the hoses. The diameter of the hose coils around spindle 31 is substantially larger than the spindle. Hose 38 is supplied with hydraulic fluid under pressure from pump 81B. The hydraulic motor and speed reducer or gear box can be located within the wheel adjacent the inside of leg 34.

Front wheels 13 and 14 are also driven with separate motors (not shown), as hydraulic fluid operated motors. A pump 81A supplies hydraulic fluid under pressure to the fluid motors driving front wheels 12 and 13. The hydraulic drive system for the three wheels 12, 13, and 14 is disclosed in co-pending U.S. patent application Ser. No. 169,191, filed July 15, 1980. The disclosure of this application is herein incorporated by reference.

A steering apparatus indicated generally at 39 is located above transverse cross member 27 in a chamber 41 below a protective cover 42. Cover 42 located behind seat 23 is secured to transverse member 27 with suitable fasteners, such as bolts.

Steering apparatus 39 is drivably connected to spindle 31 to rotate rear drive wheel 14 about a generally upright axis to selectively turn wheel 14 in opposite directions, as indicated by arrows 43 and 44 in FIG. 3. Steering apparatus 39 has a piston and cylinder assembly indicated generally at 46 operable to apply turning torque to spindle 31 and hold spindle 31 in a selected angular position. Piston and cylinder assembly 46 has an elongated horizontal cylinder 47 located above cross member 27. As shown in FIG. 4, cylinder 47 has an elongated linear cylindrical chamber 48 slidably accommodating a piston 49. Piston 49 is a cylindrical member located in sliding sealing engagement with the inside wall of cylinder 47. Piston 49 can be provided with suitable seals or rings located in sealing engagement with the inside wall of cylinder 47. A first horizontal piston rod 51 is secured to the left side of piston 49. Rod 51 extends through a suitable hole in an end member 52 mounted on cylinder 47. A second piston rod 53 is secured to the right side of piston 49. Rod 53 extends through a hole in end member 54 mounted on cylinder 47. Rods 51 and 53 can be a single rod extended through cylinder 47. Suitable seals cooperate with rods 51 and 53 and end members 52 and 54 to prevent leakage of hydraulic fluid from chamber 48. The outer end of rod 51 is connected to a mount or bracket 56 attached to cross member 27 with a bolt 59. Bracket 56 has a hole accommodating bolt 59. Bolt 59 is threaded into a sleeve 58 secured to the end of rod 51 with a transverse pin. The outer end of rod 53 is connected to a mount or bracket 61 secured to cross member 27 with a bolt 64. Bracket 61 has a hole accommodating bolt 64. Bolt 64 is threaded into a sleeve 63 secured to rod 33. The outer ends of sleeves 58 and 63 have a small amount of clearance with adjacent sides of brackets 56 and 61. Bolts 59 and 64 are turned into sleeves 58 and 63, moving sleeves 58 and 63 toward fixed brackets 56 and 61. This places rods 51 and 53 or a single rod under tension and reduces lateral bending and flexing of the rods when cylinder 47 is subjected to loads and hydraulic fluid pressure. Bolts 59 and 64 and 58 and 63 are also used to adjust the axial location of piston 49. This adjusts the position of cylinder 47 relative to rod 53. The adjustment of the longitudinal position of cylinder 47 adjusts the angular position of wheel 14 about the upright axis of post 31.

A power transmitting means indicated generally at 66 is connected to end members 52 and 54. Power transmitting means 66 functions to change powered linear movement of cylinder 47 along rods 51 and 52 into rotational or arcuate movement of spindle 31 thereby turning wheel 14 to steer vehicle 10. Power transmitting means 66 has a double sprocket 67 secured to the top of spindle 31 with a plurality of bolts 68, as shown in FIg. 5. Other means can be used to secure sprocket 67 to spindle 31. A first flexible member or link chain 69 is located on a first portion of sprocket 67, as shown in FIG. 4, and anchored to sprocket 67 with a clamp or bolt 71. Chain 69 extends from bolt 71 over an arcuate segment of sprocket 67 to cylinder end 52. As shown in FIG. 6, cylinder end 52 has a pair of spaced ears 72 and 73 accommodating a portion of chain 69. A nut and bolt assembly 74 secures chain 69 to ears 72 and 73. Other fastening means can be used to secure chain 69 to end member 52. The fastening means can be adjustable to adjust the tension of chain 69.

A second flexible member or link chain 76 is anchored to a portion of sprocket 67 with a bolt 77. Bolt 77 is diametrically opposite bolt 71 whereby a second link chain 76 extends over an opposite arcuate sector of sprocket 67. An end of second link chain 76 is connected to cylinder end member 54 with a nut and bolt assembly 78. Chains 69 and 76 may be replaced with elongated flexible cable or similar flexible elongated means that connect spindle 31 to the opposite ends of the piston and cylinder assembly 46. Bolts 71 and 77 are threaded into sprocket 67 at different elevations. Sprocket 67 can be provided with outwardly directed ears to accommodate pins for connecting the chains 69 and 76 to the ears. Also, bolts 71 and 77 can be vertically aligned with each other so that each chain 69 and 76 engages about a 180 degree section of sprocket 67.

The piston and cylinder assembly 46 is operable to selectively rotate sprocket 67 in opposite directions, as indicated by the arrow 79. The piston and cylinder assembly 46 is supplied with hydraulic fluid under pressure by a pump 81C driven by an internal combustion engine 82. A belt and pulley drive 83 drivably connects engine 82 with pump means comprising three pumps 81A, 81B, and 81C. Pump 81C operates to discharge hydraulic fluid under pressure through line 84 to a control valve 86. The control valve 86 may be a 211–1016 Char-Lynn power steering unit and the control shaft assembly a 204–1007 steering column, both available from Char-Lynn Division of Eaton Corporation, Eden Prairie, Minn.

Referring to FIG. 7, spool 93 is a rotatable member attached to the shaft 21 of steering wheel 20. Spool 93 has a first passage 94 for carrying fluid from line 84 into line 88 and a second passage 95 for carrying fluid from line 87 into reservoir line 89. Lines 87 and 88 are connected to flexible hoses 99 and 101, respectively. Hose 99 is connected to the right end of cylinder 47. Hose 101 is connected to the left end of cylinder 47. When spool 93 is moved to a first position by rotating steering wheel 20 clockwise, pump 81C delivers hydraulic fluid under pressure to the left side of cylinder 47. The fluid from the right side of cylinder 47 returns via hose 99 and lines 87 and 89 to reservoir 91. Cylinder 47 is moved to the right on rods 51 and 53 turning spindle 31 and wheel 14 in a counterclockwise direction. Piston 49 remains in the central location being secured to rods 51 and 53.

When steering wheel 20 is turned in the opposite or counterclockwise direction, third and fourth passages 96 and 97 are aligned with the lines 84, 87, 88, and 89, respectively, so that hydraulic fluid under pressure is delivered via line 87 and hose 99 to the right end of cylinder 47. The fluid in the left end of cylinder 47 is returned via hose 101 and lines 88 and 89 to reservoir 91. This moves cylinder 47 to the left and turning spindle 31 and wheel 14 in a clockwise direction.

When steering wheel 20 is in its center or intermediate position, spool 93 blocks the flow of hydraulic fluid to the cylinder 47. The hydraulic fluid being trapped in chamber 48 and lines 87 and 88 holds the cylinder 47 in a fixed position. The trapped fluid holds wheel 14 in a selected fixed steering position.

In use, pump 81C can be one of several pumps driven by the internal combustion engine 82 to deliver hydraulic fluid under pressure selectively to opposite ends of the piston and cylinder assembly 46. Valve 86 can be a linearly moving valve operated by a hand lever to control the flow of hydraulic fluid to and from opposite ends of the piston and cylinder assembly 46. Alternatively, valve 86 can be replaced with two linearly moving valves operated by separate hand levers located on opposite sides of seat 23. The hand levers can be operable to selectively control the flow of hydraulic fluid under pressure to opposite ends of the piston and cylinder assembly 46. Other types of valves and controls for the valves can be used for controlling the flow of hydraulic fluid under pressure to the piston and cylinder unit assembly 46 and allowing return flow of hydraulic fluid from the piston and cylinder unit 46.

While there has been shown and described the embodiment of the power steering system for the motor vehicle, it is understood that changes in the structure can be made by one skilled in the art without departing from the invention. The invention is defined in the following Claims.

The embodiment of the invention in which an exclusive property or privilege is claimed is defined as follows:

1. A vehicle comprising: a frame, a pair of drive wheel means and a steerable wheel operatively associated with the frame and engageable with the ground, first means rotatably mounting said steerable wheel on the frame for movement about a generally upright axis to steer said vehicle, said first means including an upright spindle and means rotatably mounting the spindle on the frame for rotation about a generally upright axis, second means connected to said spindle for rotating said spindle about said upright axis, said second means including linearly movable cylinder means having a chamber, piston means located in the chamber, stationary rod means connected to the piston means to locate the piston means in longitudinal alignment with said upright axis, said rod means having opposite ends, first mount means for supporting one end of the rod means on the frame, second mount means for supporting the other end of the rod means on the frame, first adjustable means connecting the one end of the rod means to the first mount means, second adjustable means connecting the other end of the rod means to the second mount means, said first and second adjustable means holding the rod means in tension along the length thereof, said cylinder means being movable relative to the piston means and rod means, power transmitting means connecting the cylinder means with the spindle whereby on linear movement of the cylinder means relative to the rod means and piston means, the spindle is rotated about the generally upright axis to turn said steerable wheel about said upright axis to steer the vehicle, said power transmitting means including first and second elongated flexible members, said first flexible member being connected to one end of the cylinder means and the spindle, said second flexible member being connected to the other end of the cylinder means and the spindle, means to selectively supply and drain fluid under pressure to and from opposite ends of said cylinder means to move said cylinder means in selected opposite linear directions relative to the rod means and piston means, fluid operated motor means mounted on the first means operatively associated with the steerable wheel to rotate the steerable wheel, line means connected to the fluid operated motor means for carrying fluid under pressure to and from the motor means, said line means having a coiled section located around the spindle, and means for holding the coiled section above said steerable wheel and around said spindle.

2. The vehicle of claim 1 wherein: the power transmitting means includes sprocket means secured to the spindle, and the flexible members comprise chain means connected to the sprocket means and cylinder means.

3. The vehicle of claim 2 wherein: the chain means includes a first chain secured to the sprocket means and a first portion of the cylinder means, and a second chain secured to the sprocket means and a second portion of the cylinder means.

4. The vehicle of claim 3 including: first connecting means attaching the first chain to the sprocket means, and second connecting means attaching the second chain to the sprocket means.

5. The vehicle of claim 1 wherein: said means to supply fluid under pressure to said cylinder means includes a pump means operable to deliver fluid under pressure, control valve means for having movable means operable to selectively direct fluid under pressure to opposite ends of said cylinder means, and steering means operatively connected to the movable means of said control valve, said steering means being movable to move the movable means to control the flow of fluid under pressure through said valve means.

6. The vehicle of claim 5 wherein: the steering means comprises a steering wheel connected to the movable means to rotate the movable means.

7. A vehicle comprising: a frame, steerable wheel, wheel support means mounting the steerable wheel for movement about a generally upright axis, piston means, means mounting the piston means on the frame, cylinder means having a chamber, said piston means being located in said chamber whereby the cylinder means is slidably mounted on the piston means, power transmitting means connecting the cylinder means with the wheel support means whereby on movement of the cylinder means relative to the piston means the steerable wheel is rotated about the upright axis, means to selectively supply fluid under pressure to opposite ends of said chamber of said cylinder means to move said cylinder means in selected opposite directions, fluid operated motor means mounted on the wheel support means operably associated with the steerable wheel to rotate said steerable wheel, line means connected to the fluid operated motor means for carrying fluid under pressure to and from the motor means, said line means having a coil section located about the generally upright axis of the wheel support means, and means for holding the coil section above said steerable wheel adjacent the frame.

8. The vehicle of claim 7 wherein: the power transmitting means includes sprocket means secured to the wheel support means, and chain means connected to the sprocket means and cylinder means.

9. The vehicle of claim 8 wherein: the chain means includes a first chain secured to the sprocket means and a first portion of the cylinder means, and a second chain secured to the sprocket means and a second portion of the cylinder means.

10. The vehicle of claim 9 including: first connecting means attaching the first chain to the sprocket means, and second connecting means attaching the second chain to the sprocket means.

11. The vehicle of claim 7 wherein: the power transmitting means includes circular means connected to the wheel support means and elongated flexible means connected to the circular means and cylinder means whereby on linear movement of the cylinder means the flexible means rotates said cylinder means thereby rotating said one of said wheel means about the generally upright axis to steer said vehicle.

12. The vehicle of claim 11 wherein: said flexible means includes a first flexible member secured to said circular means and a first portion of the cylinder means, and a second flexible member secured to the circular means and a second portion of the cylinder means.

13. The vehicle of claim 12 wherein: first connecting means securing the first flexible member to said circular means, and second connecting means securing said second flexible member to said circular means.

14. The vehicle of claim 7 wherein: the means mounting the piston means includes rod means having a first end and a second end, first mount means supporting the first end of the rod means, second mount means supporting the second end of the rod means.

15. The vehicle of claim 14 including: means coupling the opposite ends of the rod means to the first and second mount means so as to hold the rod means in tension along the length of the rod means.

16. The vehicle of claim 7 wherein: the means mounting the piston means on the frame includes rod means comprising linear rod means having a first end and a second end opposite the first end, means mounting the rod means on the frame including first and second mounts secured to the frame adjacent the first and second ends of the rod means, first means connecting the first end of the rod means to the first mount, and second means connecting the second end of the rod means to the second mount, at least one of said first and second means being adjustable so as to hold the rod means in tension along the length of the rod means.

17. The vehicle of claim 7 wherein: said means to supply fluid under pressure to said cylinder means includes a pump means operable to deliver fluid under pressure, control valve means for having movable means operable to selectively direct fluid under pressure to opposite ends of said cylinder means, and steering means operatively connected to the movable means of said control valve, said steering means being movable to move the movable means to control the flow of fluid under pressure through said valve means.

18. The vehicle of claim 17 wherein: the steering means comprises a steering wheel connected to the movable means to rotate the movable means.

19. A vehicle comprising: a frame, a plurality of wheel means operatively associated with the frame for supporting the frame above the ground, first means rotatably mounting one of said wheel means for movement about a generally upright axis to steer said vehicle, second means connected to said first means for rotating said first means, fluid operated motor means mounted on the first means operatively associated with said one of said wheel means to drive the same, line means connected to the fluid operated motor means for carrying fluid under pressure to and from the motor means, said line means having a coiled section located around said upright axis, and means for holding the coiled section of the line means above said one of said wheel means and around said upright axis.

20. The vehicle of claim 19 wherein: said first means includes a generally upright spindle, means rotatably mounting the spindle on the frame, said coiled section of the line means being located about said spindle.

21. The vehicle of claim 20 wherein: the means for holding the coiled section includes retainer means secured to the frame supporting the coiled section above said one of said wheel means.

22. The vehicle of claim 19 wherein: the second means includes a piston and cylinder assembly, means attaching the piston to the frame, and motion transmission means connecting the cylinder to the first means for rotating the first means in response to movement of the cylinder and means for supplying fluid under pressure to the piston and cylinder assembly.

23. The vehicle of claim 19 wherein: the plurality of wheel means includes a pair of front wheels and a single rear wheel, said rear wheel being the one of said wheel means.

24. A vehicle comprising: a frame, a plurality of wheel means operatively associated with the frame and engageable with the ground, first means rotatably mounting one of said wheel means on the frame for movement about a generally upright axis to steer said vehicle, second means connected to said first means for rotating said first means, said second means including cylinder means having a chamber, piston means located in the chamber, rod means connected to the piston means, means mounting the second means on the frame, said piston means and cylinder means being movable relative to each other, power transmitting means connecting the second means with the first means whereby on relative movement of the piston means and cylinder means the first means is rotated about the generally upright axis to turn said one of said wheel means about said upright axis to steer the vehicle, means to supply fluid under pressure to said second means to provide relative movement of said piston means and cylinder means in selected opposite linear directions, fluid operated motor means mounted on the first means operably associated with the one of said wheel means to rotate said one of said wheel means, line means connected to the fluid operated motor means for carrying fluid under pressure to and from the motor means, said line means having a coil section located around the first means adjacent the frame, and retainer means for holding the coil section above the one of said wheel means.

25. The vehicle of claim 24 wherein: the first means includes an upright spindle, and means rotatably mounting the spindle on the frame, said second means being connected to said spindle.

26. The vehicle of chain 25 wherein: the power transmitting means includes sprocket means secured to the spindle, and chain means connected to the sprocket means and second means.

27. The vehicle of claim 26 wherein: the chain means includes a first chain secured to the sprocket means and a first portion of the second means, and a second chain secured to the sprocket means and a second portion of the second means.

28. The vehicle of claim 24 wherein: the power transmitting means includes circular means connected to the first means and elongated flexible means connected to the circular means and second means whereby on linear movement of the second means the flexible means rotates said circular means thereby rotating said one of said wheel means about the generally upright axis to steer said vehicle.

29. The vehicle of claim 28 wherein: said flexible means includes a first flexible member secured to said circular means and a first portion of the second means, and a second flexible member secured to the circular means and a second portion of the second means.

30. The vehicle of claim 24 wherein: said means to supply fluid under pressure to said second means includes a pump means operable to deliver fluid under pressure, control valve means for having movable means operable to selectively direct fluid under pressure to opposite portions of said second means, and steering means operatively connected to the movable means of said control valve, said steering means being movable to move the movable means to control the flow of fluid under pressure through said valve means.

31. The vehicle of claim 30 wherein: the steering means comprises a steering wheel connected to the movable means to rotate the movable means.

* * * * *

UNITED STATES PATENT AND TRADEMARK OFFICE
CERTIFICATE OF CORRECTION

PATENT NO. : 4,361,203
DATED : November 30, 1982
INVENTOR(S) : Floyd E. Buschbom It is certified that error appears in the above-identified patent and that said Letters Patent are hereby corrected as shown below:

Column 1, line 41, "they" should be -- the --.

Column 3, line 61, "FIg." should be -- FIG. --.

Column 8, line 49, "Chain" should be -- Claim --.

Signed and Sealed this

Eighth Day of February 1983

[SEAL]

Attest:

Attesting Officer

GERALD J. MOSSINGHOFF
Commissioner of Patents and Trademarks